United States Patent
Chaisy et al.

(10) Patent No.: US 12,094,361 B2
(45) Date of Patent: Sep. 17, 2024

(54) ASSEMBLY AND METHOD FOR TRAINING OPERATORS ON A CNC MACHINING DEVICE, PRODUCTION ASSEMBLY COMPRISING SUCH A TRAINING ASSEMBLY

(71) Applicant: FRAMATOME, Courbevoie (FR)

(72) Inventors: Cédric Chaisy, Saultain (FR); Franck Copin, Mons en Pevele (FR)

(73) Assignee: FRAMATOME, Courbevoie (FR)

( * ) Notice: Subject to any disclaimer, the term of this patent is extended or adjusted under 35 U.S.C. 154(b) by 0 days.

(21) Appl. No.: 17/917,238

(22) PCT Filed: Apr. 7, 2021

(86) PCT No.: PCT/EP2021/059044
§ 371 (c)(1),
(2) Date: Oct. 5, 2022

(87) PCT Pub. No.: WO2021/204864
PCT Pub. Date: Oct. 14, 2021

(65) Prior Publication Data
US 2023/0154346 A1 May 18, 2023

(30) Foreign Application Priority Data
Apr. 7, 2020 (FR) .................................... 20 03459

(51) Int. Cl.
*G09B 19/00* (2006.01)
*G05B 19/4155* (2006.01)
*G09B 5/02* (2006.01)

(52) U.S. Cl.
CPC ........... *G09B 5/02* (2013.01); *G05B 19/4155* (2013.01); *G05B 2219/33099* (2013.01)

(58) Field of Classification Search
CPC ............................. G09B 9/00; G05B 19/4155
See application file for complete search history.

(56) References Cited

U.S. PATENT DOCUMENTS

| 6,033,226 A | * | 3/2000 | Bullen | G09B 9/00 |
| | | | | 434/219 |
| 2003/0228560 A1 | * | 12/2003 | Seat | G09B 19/00 |
| | | | | 434/219 |
| 2005/0102054 A1 | | 5/2005 | Dolansky | |

(Continued)

FOREIGN PATENT DOCUMENTS

| DE | 102006029527 A1 | 12/2007 |
| EP | 2254013 A1 | 11/2010 |

OTHER PUBLICATIONS

International Search Report for PCT/EP2021/059044.
Corresponding Search Report for FR2003459.

*Primary Examiner* — Peter R Egloff
(74) *Attorney, Agent, or Firm* — Davidson Kappel LLC

(57) ABSTRACT

A CNC machining device (1) comprises a control console (3) and a CNC machine (5). A training assembly (33) for training operation of the CNC machining device includes a training control console (35) substantially identical to the control console (3) of the CNC machining device (1); a digital twin (36) of the CNC machine (5), comprising a simulator (37) configured to simulate the effect of commands from the training control console (35) on the CNC machine (5); and a display device (39) configured for a trainee to view the current state of the simulator (37).

22 Claims, 2 Drawing Sheets

(56) References Cited

U.S. PATENT DOCUMENTS

| | | | |
|---|---|---|---|
| 2007/0184428 A1* | 8/2007 | Fabris | G09B 5/00 |
| | | | 434/379 |
| 2007/0248937 A1* | 10/2007 | Chen | G09B 19/0069 |
| | | | 434/118 |
| 2012/0004897 A1* | 1/2012 | Chen | G09B 25/02 |
| | | | 703/21 |
| 2012/0065767 A1 | 3/2012 | Oiwa et al. | |
| 2016/0266574 A1* | 9/2016 | Legoupi | G05B 19/4069 |
| 2017/0308057 A1 | 10/2017 | Kreidler | |

* cited by examiner

ASSEMBLY AND METHOD FOR TRAINING OPERATORS ON A CNC MACHINING DEVICE, PRODUCTION ASSEMBLY COMPRISING SUCH A TRAINING ASSEMBLY

The present disclosure relates in general to the training of operators on computer numerical control (CNC) machining devices.

BACKGROUND

A company needs to train its operators in the use of its CNC machining equipment. These devices are, for example, lathes, milling machines, or machining centres. The training to be provided is either basic training, for operators who have never worked with the company's machines, or advanced training, for experienced operators.

Operators are typically trained first outside the company, in schools or training centres. In a second phase, they are trained by experienced operators directly on the company's machining devices and on production parts.

SUMMARY

Such an approach has many flaws.

Schools and training centres do not always train on the models of machining equipment with which the company is equipped, or do not train on the working methods used in the company with machining equipment.

Training carried out directly on the company's machines degrades production rates. They are carried out on production parts, i.e. on parts intended for sale or for use by the company. The fact that these parts are machined by trainees increases the risk of non-quality. The operator has no room for error, so the situation is uncomfortable for him and his trainer. As a result, it is not possible to test risky situations, and the range of operations that the trainee can learn is reduced.

In this context, the present disclosure aims to provide an approach to operator training that does not have the above shortcomings.

To this end, the present disclosure relates according to a first aspect to an assembly for training operators on a CNC machining device comprising a control console and a CNC machine with at least one axis having at least one frame, at least one manipulator member and at least one machining tool capable of being manipulated by the at least one manipulator member, the CNC machine being controlled by the control console, the training assembly comprising:

- a training control console substantially identical to the control console of the CNC machining device;
- a digital twin of the CNC machine-tool, comprising a simulator and an interface module connecting the training control console to the simulator, the interface module being configured to transmit to the simulator commands generated by the trainee using the training control console, the simulator being configured to simulate the effect of the transmitted commands on the CNC machine-tool;
- a display device configured for a trainee to view the current state of the simulator.

Thus, the trainee handles a training control console that is substantially identical to the control console of the CNC machining device. The trainee can become familiar with all the controls available from this console.

The use of a digital twin comprising a simulator of the CNC machine and a device for displaying the current state of the simulator allows the trainee to be placed in an environment very close to their real working environment.

Because an interface module transmits the commands generated by the trainee to the simulator using the training control console, the trainee can see the effect of the commands on the CNC machine.

The training assembly has many other advantages:
- reduces training time on actual machining devices;
- reduces the risk of non-quality;
- gives the trainee the right to make mistakes;
- allows for testing of risky situations;
- enables remote training to be carried out, from rooms equipped only with a training control console and a display device, the digital twin being loaded onto a computing device such as a server, a portable PC or any other suitable medium; this computing device may be remote or local;
- easily allows the creation of multiple working environments, corresponding to different machining devices;
- trains operators on existing part models;
- makes it possible to attempt to optimise existing programs, i.e. to optimise existing machining programs, for example to save time;
- easily testing new product designs or machining methods;
- anticipating the training of operators on machines not yet delivered to the company;
- making a self-service operator training solution available.

The training assembly may furthermore exhibit one or more of the following features, taken in isolation or in any combination that is technically possible:
- the assembly comprises at least one machining program for use by the CNC machine to machine a workpiece, the CNC training console being configured for the trainee to be able to generate the following commands:
  loading the or a machining program into the CNC training console;
  running said machining program by the simulator;
- the simulator being configured to simulate the running of said machining program by the CNC machine-tool;
- the assembly comprises at least one digital model of a blank of the workpiece, the simulator being configured to simulate the running of said machining program by the CNC machine on said blank using said digital model of the blank;
- the training control console is configured so that the trainee can generate one or more of the following commands:
  stopping at a point of said machining program, a shape of the blank at said point being saved;
  resuming said machining program from said point, using said saved shape;
  quitting at a point of said machining program, a shape of the blank at said point being saved;
- the simulator being configured to simulate the running of said command by the CNC machine-tool;
- the assembly comprises at least one digital model of a blank clamping tool, the training control console being configured so that the trainee can generate and transmit to the interface module the digital information necessary for placing the blank and the blank clamping tools on the frame at a determined position, the simulator being configured to simulate the clamping of the blank on the frame at said determined position using the at least one digital model of the blank and the at least one digital model of the blank clamping tool;

the assembly comprises at least one digital model of the workpiece in the final state, and a module configured to determine dimensions of the blank during and/or at the end of machining and to compare said dimensions with corresponding dimensions of the digital model of the workpiece in the final state;

the assembly comprises a module configured to detect:
  interference between parts of the CNC machine or between a part of the CNC machine and the blank;
  too rapid an arrival of the machining tool in the blank;

the assembly comprises at least one digital model of the at least one machining tool, the simulator being configured to simulate the execution of said machining program by the CNC machine using said digital model of the at least one machining tool;

the training control console is configured so that the trainee can generate at least one of the following commands:
  loading an identification of the at least one machining tool;
  entering data relating to the dimensions of the at least one machining tool;
  moving at least one axis of the CNC machine;
  entering corrective data to correct the use of the at least one machining tool in the event of a fault due to an incorrect setting of the machining tool on the CNC machine or due to wear of the at least one machining tool;
  replacing one machining tool with another;

the simulator (37) being configured to simulate the effect of the at least one command on the CNC machine;

the simulator is configured to simulate:
  noise generated by the CNC machine; and/or
  vibrations generated by the CNC machine; and/or
  a direction of rotation of the machining tool; and/or
  lubrication of the machining tool.

According to a second aspect, the present disclosure relates to a method of training operators on a CNC machining device comprising a control console and a CNC machine having at least one frame, at least one manipulator with at least one axis and at least one machining tool capable of being manipulated by the at least one manipulator, the CNC machine being controlled by the control console, the method comprising the following steps:
  providing a training control console substantially identical to the control console of the CNC machining device;
  providing a digital twin of the CNC machine comprising a simulator of the CNC machine;
  acquiring commands generated by the trainee using the training control console;
  simulating the effect of the commands transmitted to the CNC machine using the simulator;
  displaying a current state of the simulator on a display device during the simulation.

The training method may furthermore exhibit one or more of the following features, taken in isolation or in any combination that is technically possible:
  the commands generated by the trainee and acquired in the acquisition stage comprise at least:
    loading a machining program that can be used by the CNC machine to machine a workpiece into the training CNC console;
    running said machining program by the simulator;
  the simulator in the simulation step simulating the running of said machining program by the CNC machine;
  the method comprises a step of providing a digital model of a workpiece blank, the simulator in the simulation step simulating the running of said at least one machining program by the CNC machine using said digital model of the workpiece blank;
  the commands generated by the trainee and acquired in the acquisition stage comprise at least one of the following commands:
    stopping at a point of said machining program, a shape of the blank at said point being saved;
    resuming said machining program from said point, using said saved shape;
    quitting at a point of said machining program, a shape of the blank at said point being saved;
  the effect of said at least one command on the CNC machine is simulated by the simulator in the simulation step;
  the method comprises:
    a step of providing at least one digital model of a blank clamping tool;
    a step of generating and transmitting to the digital twin the digital information necessary to place the blank and the tools for clamping the blank on the frame at a determined position;
  the simulator in the simulation step simulating the clamping of the blank to the frame at said determined position using the at least one digital model of the blank and the at least one digital model of the blank clamping tool;
  the method comprises a step of providing a digital model of the workpiece in the final state, the simulation step comprising a sub-step of determining dimensions of the blank during and/or at the end of machining and a sub-step of comparing said dimensions with corresponding dimensions of said digital model of the workpiece in the final state;
  the method comprises the following steps:
    detecting interference between parts of the CNC machine or between a part of the CNC machine and the blank;
    detecting too rapid an arrival of the machining tool in the blank;
  the method comprises a step of providing at least one digital model of the at least one machining tool, the simulator in the simulation step simulating the running of said machining program by the CNC machine using said digital model of the at least one machining tool;
  the commands generated by the trainee and acquired in the acquisition stage comprise at least one of the following commands:
    loading the identification of the at least one machining tool;
    entering data relating to the dimensions of the machining tool;
    moving at least one axis of the CNC machine;
    entering corrective data relating to the dimensions of the machining tool;
    replacing one machining tool with another;
  the effect of said at least one command on the CNC machine is simulated by the simulator in the simulation step;
  the simulation step comprises one or more of the following operations:
    simulating noise generated by the CNC machine;
    simulating vibrations generated by the CNC machine;
    simulating the direction of rotation of the machining tool;
    simulating the lubrication of the machining tool.

In a third aspect, the present disclosure relates to a production assembly comprising:
- a CNC machining device comprising a control console and a CNC machine with at least one axis having at least one frame, at least one manipulator and at least one machining tool capable of being manipulated by the at least one manipulator, the CNC machine being controlled by the control console,
- a training assembly with the above characteristics;
- the digital twin being connected to the production control console of the CNC machine, so that the simulator simulates the effect of commands generated by an operator at the control console on the CNC machine.

The training assembly is thus configured to allow the simulator to be connected to the production control console of the machine.

Thus, the virtual machine simulates in real time the operations performed by the real machine.

This allows a remote supervisor to oversee operations performed by a trainee on the real machine, or to oversee new methods/procedures tested on the real machine.

This also allows an operator to program and test program changes entered directly on the actual machine tool. If the operator makes a mistake, the virtual machine will be able to anticipate it and stop the real machine tool.

BRIEF SUMMARY OF THE DRAWINGS

Further features and advantages of the present disclosure will be apparent from the detailed description given below, by way of indication and not in any way limiting, with reference to the appended figures, among which.

DETAILED DESCRIPTION

Figure 1:
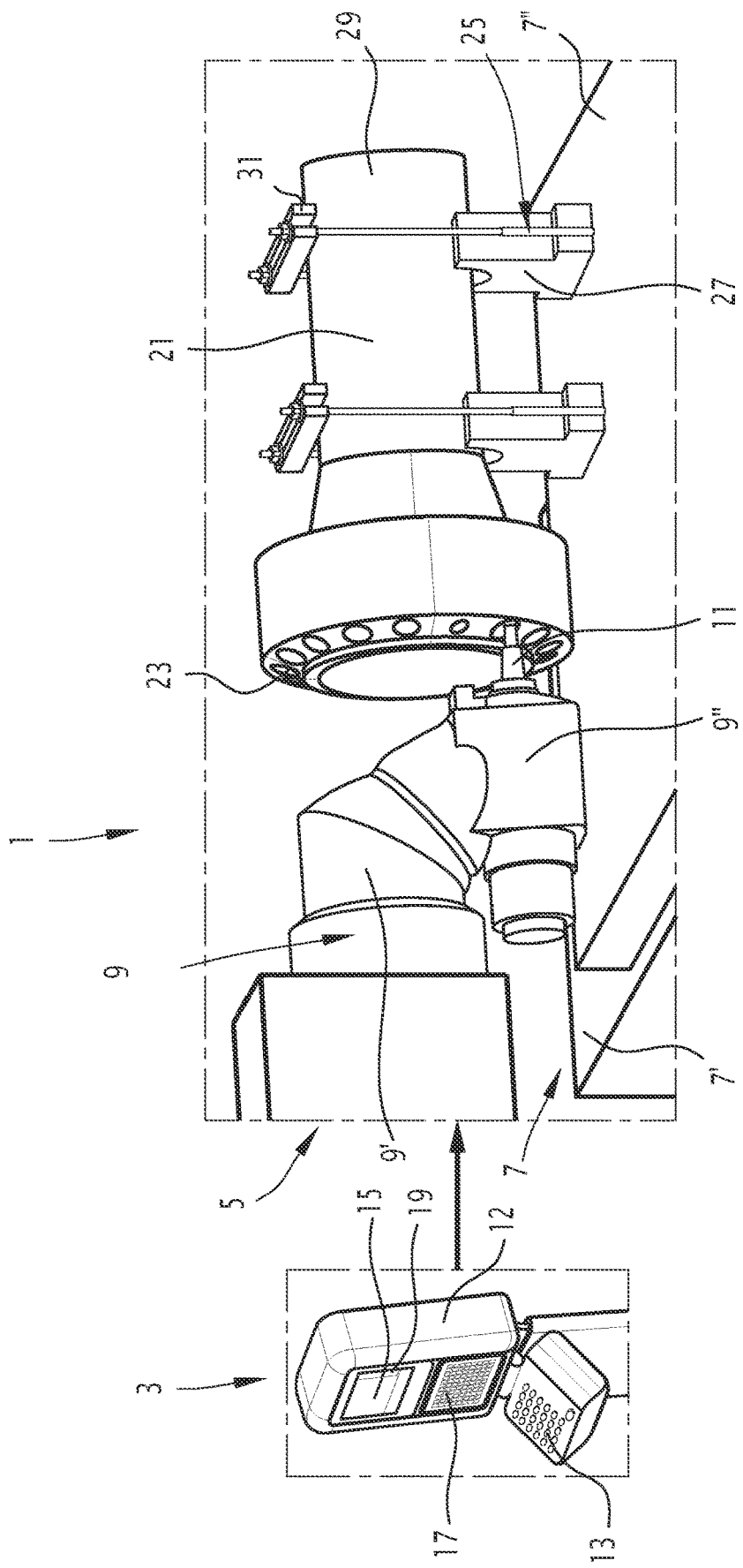
FIG. 1 is a schematic representation of a CNC machining device.

The training system of the present disclosure is intended to provide training for operators of a CNC machining device 1 of the type shown in FIG. 1.

This CNC machining device 1 is for example a lathe, a milling machine, or a multi-functional machine allowing both turning and milling operations to be performed.

The CNC machining device 1 comprises a control console 3 and a CNC machine 5 with at least one axis.

Typically, the CNC machine 5 comprises several simultaneously controlled axes, for example between one and nine simultaneously controlled axes.

The machine 5 comprises at least one frame 7, at least one manipulator 9 and at least one machining tool 11 which can be handled by the at least one manipulator 9.

The frame 7 comprises a fixed structure 7' and a movable plate 7" movable relative to the fixed structure 7' by means of at least one of the axes. The movable plate 7" is movable relative to the fixed structure 7' by means of a rotary axis and/or by means of one or more linear axes.

The or each manipulator 9 comprises a tool holder 9' and has one or more axes 9" for moving the tool holder 9' relative to the fixed structure 7". The tool holder 9' is a spindle in the case of a milling, boring or multi-function machine, and a turret in the case of a lathe. The 9" axes are rotary and/or linear axes.

The machining tool 11 is of any suitable type: Milling cutter, grinding wheel, drill, reamer, or insert turning tool.

The machining tool 11 is typically detachably attached to the manipulator 9, more precisely to the tool holder 9'.

Preferably, the machine 5 is equipped with several machining tools 11 that are different from each other. These machining tools 11 can each be mounted on the manipulator 9, replacing each other.

Typically, the machine 5 has a single manipulator 9. Alternatively, the machine 5 comprises several manipulators 9, each of which can handle a machining tool. These different manipulators can be used simultaneously.

The CNC machine 5 is controlled by the control console 3.

The control console 3 is configured to, among other things:
- Load a machining program, which will be run by the CNC machine 5;
- Start the milling machine by switching on the control console 3;
- Start the machining of a blank part, according to the previously loaded machining program;
- Control each axis of the CNC machine 5, individually or in combination with other axes;
- Carry out the management of the machining tools, i.e. enter in the machine the identification of the machining tools used by the loaded machining program;
- Enter tool gauges; these gauges characterise the dimensions of a tool (i.e. diameter, length), and are entered via the control console;
- Enter tool offsets; these offsets are numerical values entered via the control console and allow the tool to be corrected in the event of a fault due to incorrect setting of the machining tool on the machine or due to tool wear;
- Replace one machining tool with another.

As a rule, all functions that are controlled from the control console can be controlled from the training control console: Stopping the machine, manual handling of axes, management of running machine programs, setting of machine origins, running programs on the machine, emergency stop, etc.

The control console 3 typically comprises a console frame 12 carrying a display 15, a keyboard 17, and a plurality of control keys/buttons/knobs 13. The screen 15 may be touch-sensitive, with the keyboard 17 formed on the screen 15. The keyboard 17 is used to enter numerical information into the CNC machine.

The control console 3 typically also has navigation menus 19. The keypad 17, the display 15, and the plurality of control buttons/knobs/knobs 13 are configured for an operator to control the various functions listed above. Depending on the machine, the control console 3 may comprise a manual control over the machine.

The panel carrying the plurality of control keys/buttons/knobs 13 may be in the form of a second keyboard semi-fixed to the console frame 12, as shown in the figures. But it could also form a single element with the keyboard 17 or be an independent element.

The control console 3 can therefore take on a different form than shown in the figures.

Advantageously, the control console 3 has a remote control (not shown), which communicates with the console frame 12 by wire or by radio.

The machining device 5 is provided for machining a blank 21, so as to obtain a machined part according to predetermined specifications. The blank 21 is typically a metal part, which can have any suitable shape. The machining operation involves removing material from the blank 21 to create predetermined shapes such as bores 23.

The processing machine 5 further comprises at least one clamping tool 25, configured to clamp the blank 21 to the frame 7 at a specific position relative to the frame 7.

The blank 21 is typically clamped to the movable plate 7".

The or each clamping tool 25 is dependent on the shape of the blank 21. In the example shown, the or each clamping tool 25 comprises two sub-assemblies, each equipped with a cradle 27, two substantially vertical rods 29 integral with the cradle 27 and arranged on either side of the blank 21, and a clamp or jaw 31 mounted on the rods 29. The blank 21 is clamped between the cradle 27 and the clamp or jaw 31.

The machine 5 is usually placed in a cabin, not shown, with the control console 3 located outside the cabin.

Figure 2:
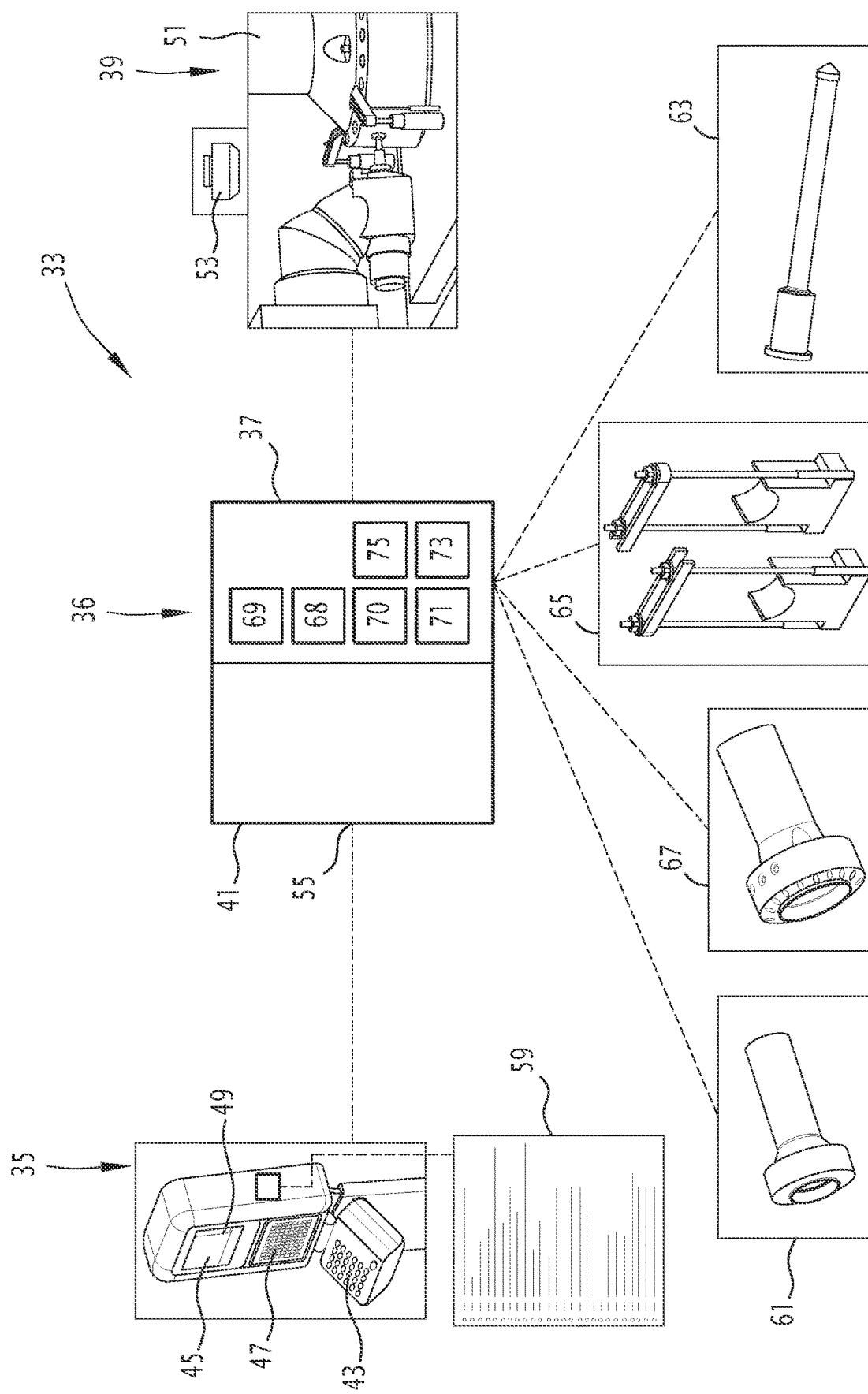
FIG. 2 is a simplified schematic representation of an assembly for training operators on the CNC machining device of FIG. 1, in accordance with the present disclosure.

As seen in FIG. 2, the training assembly 33 comprises:
- a training control console 35 substantially identical to the control console 3 of the CNC machining device 1;
- a digital twin 36 of the CNC machine 5, comprising a simulator 37 and an interface module 41 connecting the training control console 35 to the simulator 37;
- a display device 39 configured for a trainee to view the current state of the simulator 37.

The training control console 35 has essentially the same appearance as the control console 3 of the CNC machining device 1. Preferably, it has a keyboard 47, a display 45, a plurality of control keys/buttons/knobs 43 and navigation menus 49. These elements are identical to those of the control console 3 and arranged in the same way.

If necessary, it has a remote control identical to that of the control console 3.

The display device 39 comprises for example a screen 51 and a projector 53 connected to the digital twin 37. Alternatively, the display device 39 is a virtual reality headset, or any other suitable device.

The interface module 41 is configured to transmit the commands generated by the trainee to the simulator 37 using the training control console 35, the simulator 37 being configured to simulate the effect of the transmitted commands on the CNC machine 5.

The interface module 41 has one or more inputs 55 connected to the training control console 35. It also comprises one or more outputs connected to the simulator 37.

The interface module 41 receives as input the commands generated by the trainee using the training control console 35. These commands are in the form of analogue or digital signals. The interface module 41 is configured to convert operator-generated commands into digital command signals for use by the simulator 37. These digital command signals are output from the output(s).

The interface module 41 is typically an API (Application Programming Interface) library used by the simulator 37.

The simulator 37 enables the virtual copying of the CNC machine 5.

The interface module 41 and the simulator 37 are, for example, integrated into an electronic unit which comprises a plurality of analogue electronic components and/or an information processing unit. The information processing unit comprises, for example, a processor and a memory containing software for converting the command signals received as input into command signals usable by the simulator, and software for simulating the CNC machine.

The simulator 37 is configured to digitally simulate the various components of the CNC machine 5, comprising:
- the frame 7;
- the manipulator 9;
- the machining tool 11.

The training assembly 33 comprises at least one machining program 59 that can be used by the CNC machine 5 to machine a workpiece.

The or each machining program 59 is a sequence of instructions determining relative movements of the machining tool 11 with respect to the blank 21 as a result of movements of the axis or axes of the machine 5.

Advantageously, the assembly 33 comprises several machining programs 59, corresponding to different real parts that can be manufactured using the CNC machine 5.

These machining programs 59 are pre-existing and are stored in a computer, or are created by the trainee on a computer.

The training control console 35 is configured so that the trainee can generate one or more of the following commands:
- loading the or a machining program 59 into the CNC training console 35;
- running said machining program 59 by the simulator 37;
- Alternatively, said machining program 59 is loaded into the digital twin 36.

The simulator 37 is configured to simulate the running of said machining program 59 by the CNC machine 5.

In other words, the simulator 37 is configured to calculate, using the machining program, the successive displacements of the various axes of the machine 5, and the positions of the machining tool 11 and the blank 21.

The simulator 37 is configured to calculate the material removals from the blank 21 resulting from the various movements, as well as the shape of the blank 21 after material removal.

The simulator 37 is also configured to periodically generate signals enabling the display device 39 to generate images illustrating the current positions of the components of the CNC machine 5 (comprising the frame 7, the manipulator 9 and the machining tool 11) and the shape of the blank being machined, and to transmit these signals to the display device 39.

The time period is short enough that the trainee has the impression of continuous movement when viewing the display 39.

The training assembly 33 preferably comprises at least one digital model 61 of a blank of the workpiece, the simulator 37 being configured to simulate the running of said machining program 59 by the CNC machine 5 on said blank using said digital model of the blank 61.

Typically, the training assembly 33 comprises several digital blank models 61, corresponding to several different real-life applications. These digital models correspond to different blanks 21, which can be used to manufacture the same part or different parts.

The or each digital blank model 61 is generated with CATIA® type design software. It is preferably generated by the design office. It is saved on a computer. It gives the shape of the blank 21 to be machined with an accuracy of a tenth or a hundredth of a millimetre.

The simulator 37, because of the use of such a digital model, is able to calculate with great accuracy the material removals in the blank 21 resulting from the various movements of the machining tool 11, as well as the shape of the blank 21 after material removal.

Preferably, the training assembly 33 comprises at least one digital model 63 of the at least one machining tool 11, the simulator 37 being configured to simulate the execution of said machining program by the CNC machine 5 using said digital model 63 of the at least one machining tool 11.

Typically, the training assembly 33 comprises several digital machining tool models 63, corresponding to different actual machining tools 11 used by the CNC machine 5.

The or each digital machining tool model 63 is generated with CATIA® type design software. It is advantageously generated by the company's department in charge of manufacturing methods. It is saved on a computer. It gives the shape of the corresponding machining tool 11 with an accuracy of a tenth or a hundredth of a millimetre.

The use of such a digital model contributes to the fact that the simulator 37 is able to calculate with great accuracy the material removals from the blank 21 resulting from the different movements of the machining tool 11, as well as the shape of the blank 21 after material removal.

The training assembly 33 further comprises at least one digital model 65 of a blank 21 clamping tool 25, the training control desk 35 being configured so that the trainee can generate and transmit to the digital twin 36 the digital information necessary to place the blank 21 and the blank 21 clamping tools on the frame 7 at a determined position.

The simulator 37 is configured to simulate the clamping of the blank 21 to the frame 7, typically on the movable plate 7", at said determined position using the at least one digital model 61 of the blank 21 and the at least one digital model 65 of the blank 21 clamping tool 25.

Typically, the training assembly 33 comprises several digital models 65 of the blank clamping tool 25, corresponding to several different real-life applications. These digital models correspond to different clamping tools that can be used for different blanks 21, or to different clamping tools 25 that can be used for the same blank 21.

The or each digital clamping tool model 65 is generated with CATIA® type design software. It is advantageously generated by the company's department in charge of manufacturing methods. It is saved on a computer. It gives the shape of the corresponding clamping tool 25 with an accuracy of a tenth or a hundredth of a millimetre.

The high accuracy of the models and numerical data contributes to the accuracy of the simulation of material removal from the blank 21, and to the accuracy of the calculation of the shape of the blank 21 after material removal.

Advantageously, the training assembly 33 further comprises at least one digital model 67 of the workpiece in the final state.

The training assembly 33 comprises at least one module 68 configured to determine dimensions of the blank 21 during and/or at the end of machining and to compare said dimensions with corresponding dimensions of the digital model 67 of the workpiece in the final state.

The module 68 is typically a subroutine built into the digital twin 36.

Typically, the training assembly 33 comprises a digital model 67 for each digital blank model 61.

The final-state digital workpiece model 67 is generated with CATIA® type design software. It is preferably generated by the design office. It is saved on a computer. It gives the shape of the workpiece with an accuracy of a tenth or a hundredth of a millimetre.

The use of a final-state digital workpiece model 67 by the training assembly 33 therefore allows the detection of dimensional deviations between the machined blank and the final state workpiece.

Preferably, the training assembly 33 comprises a module 69 configured to detect:
interference between parts of the CNC machine 5 or between a part of the CNC machine 5 and the blank 21;
too rapid an arrival of the machining tool 11 in the blank 21.

The module 69 is typically a subroutine built into the digital twin 36.

It is configured to determine by calculation whether the movements of the moving parts of the CNC machine 5 will cause undesired contact of the moving parts with each other, or of the moving parts with fixed parts.

The moving parts are essentially the moving table 7", the manipulator 9 and the machining tool 11. The fixed parts comprise at least the fixed structure 7' of the frame 7, the blank 21, the clamping device 25 and the cabin housing the machine 5.

The movements are the movements resulting from the application of the machining program 59 or the movements controlled directly by the trainee from the training control console 35 or from the remote control (not shown).

The training assembly 33 is configured to warn the trainee when interference is detected, by an audible or visual signal.

The module 69 is also configured to detect if the machining tool 11 is penetrating the blank 21 too quickly, which may cause a quality defect in the final workpiece and/or tool and/or machine breakage.

The module 69 is configured to evaluate the speed of movement of the machining tool 11 when it contacts the blank 21, and to compare this speed with a predetermined maximum limit.

The module 69 indicates an error if this speed is zero at the time the machining tool makes contact with the blank or if the speed of rotation of the machining tool is higher than a defined maximum limit.

The movements in question are the ones resulting from the application of the machining program 59 or the movements controlled directly by the trainee from the training control console 35 or from the remote control (not shown).

The training assembly 33 is configured to warn the trainee when too rapid arrival is detected, by an audible or visual signal.

The training assembly 33 is configured to save detected errors (interference, too rapid arrivals) in a memory 70. It is configured so that the operator can view the detected errors, for example on the display device 39, after the training session has ended.

The training control console 35 is preferably configured so that the trainee can generate at least one of the following commands:
loading an identification of the at least one machining tool 11;
entering data relating to the dimensions of the at least one machining tool 11;
moving at least one axis of the CNC machine 5;
entering corrective data to correct the use of the at least one machining tool 11 in the event of a fault due to an incorrect setting of the machining tool 11 on the CNC machine 5 or due to wear of the at least one machining tool 11;
replacing one machining tool 11 with another.

The simulator 37 is configured to simulate the effect of the at least one command on the CNC machine 5.

The loading of the machining tool identification is typically done by entering an alphanumeric reference using the keyboard 47 of the training control console 35. This reference is used by the simulator 37 to fetch data from the numerical control relating to this machining tool. This data is used to perform the simulation of the CNC machine 5.

The data relating to the dimensions of the at least one machining tool 11 is entered with the keyboard 47 and is used by the simulator 37 to perform the simulation of the CNC machine 5. This data is also called tool gauges.

The corrective data is entered with the keyboard 47 and is used by the simulator 37 to carry out the simulation of the CNC machine 5. This data is also called tool correctors.

The training control console 35 is configured so that the trainee can send commands from each axis of the manipulator 9. The trainee can command movements of each axis individually, or movements involving several axes simultaneously. These commands may or may not be integrated into a machining program.

The training control console 35 is configured so that the trainee can generate one or more of the following commands:
- stopping at a point of said machining program, a shape of the blank 21 at said point being saved;
- resuming said machining program from said point, using said saved shape;
- quitting at a point of said machining program, a shape of the blank 21 at said point being saved.

The simulator 37 being configured to simulate the running of said command by the CNC machine 5.

In the event of a stop or quit, the shape of the blank being machined is saved. This form differs from the original form of the blank.

Quitting is understood here to mean a permanent stop of the machining program, which does not allow a subsequent resumption.

The running of the machining program can be stopped, for example, in order to take measurements on the blank during machining, and then resumed.

The simulator 37 is preferably configured to simulate:
- noise generated by the CNC machine 5; and/or
- vibrations generated by the CNC machine 5; and/or
- a direction of rotation of the machining tool 11; and/or
- lubrication of the machining tool 11.

The simulator 37 comprises a noise generator 71. This noise generator typically generates a noise selected from a noise library, e.g. depending on the type of machining tool used, the speed of movement of the machining tool, the speed of rotation of the machining tool, the material of the blank, etc.

The simulator 37 comprises a vibration generator 73. This vibration generator typically generates a vibration selected from a vibration library, for example depending on the type of machining tool used, the speed of movement of the machining tool, the speed of rotation of the machining tool, the material constituting the blank, etc. These vibrations are transmitted by the vibration generator to the training control console 35 or any other suitable structure.

The direction of rotation of the machining tool 11 is determined by the machining program or directly by a command from the training control console 35. It is visible on the display device.

The simulator 37 comprises a lubrication simulator 75. The lubrication is represented either by a graphic indication or/and by graphic modelling.

The operation of the training assembly 33 will now be detailed.

The following digital models are first loaded onto a computer:
- Digital model of blank 61;
- Digital model of the machining tool 63;
- Digital model of the clamping tool 65;
- Digital model of the workpiece in the final state 67.

The machining program 59 is also prepared and loaded into the training control console 35 by the trainee or another person.

The trainee then generates commands using the training control console 35.

The interface module 41 is used to transcribe the information generated by the training control console onto the simulator 37.

The simulator 37 simulates the effect of the commands transmitted to the CNC machine 5.

The simulator 37 simulates in particular:
- the noise generated by the CNC machine 5; and/or
- the vibrations generated by the CNC machine 5; and/or
- the direction of rotation of the machining tool 11; and/or
- the lubrication of the machining tool 11.

The simulator 37 periodically generates signals which enable the display device 39 to generate images showing the current positions of the components of the CNC machine 5 (in particular the movable table 7" of the frame 7, the manipulator 9, and the machining tool 11) and the shape of the blank being machined. It transmits these signals to the display device 39.

The display 39 shows the current status of the simulator 37 during the simulation. It also displays the direction of rotation of the machining tool 11 and the lubrication of the machining tool 11.

The trainee observes the current status of the simulator 37 on the display 39.

The commands generated by the trainee using the training control console 35 comprise some or all of the following:
- Start the CNC machine 5 by switching on the training control console;
- Load a machining program 59, which will be run by the CNC machine 5.
- Start the machining of a blank part 21, according to the previously loaded machining program;
- Control each axis of the manipulator 9, individually or in combination with other axes;
- Carry out the management of machining tools 11;
- Enter the tool gauges;
- Enter the tool correctors;
- Replace one machining tool 11 with another;
- Stop at a point of said machining program, a shape of the blank 21 at said point being saved;
- Resume said machining program from said point, using said saved shape;
- Quit at a point of said machining program, a shape of the blank 21 at said point being saved.

The trainee can also generate the following commands:
- Generating and transmitting to the digital twin 36 the digital information necessary to place the blank 21 and the tools for clamping the blank 21 onto the frame 7 at a determined position;
- Measuring the blank 21 during and/or at the end of machining, and comparing it with the corresponding dimensions of the digital model 67 of the workpiece in its final state.

In the case where the training assembly 33 detects:
- interference between parts of the CNC machine 5 or between a part of the CNC machine 5 and the blank 21;
- too rapid an arrival of the machining tool 11 in the blank 21;
- the trainee is warned by an audible or visual signal. The trainee can then look for the cause of the problem and correct the defect.

The training assembly 33 saves the detected errors (interference, too rapid arrivals) in a memory 70. The operator can view the detected errors, for example on the display device 39, after the training session has ended.

According to a particularly advantageous variant, the training assembly 1 is configured to allow the connection of the digital twin 36, and more particularly the simulator 37, to the production control console 3 of the machine 5.

The commands generated by an operator on the control console 3 are thus transmitted to the interface module 41, which converts these commands into digital information usable by the simulator 37.

The simulator 37 simulates the effect of commands generated by an operator on the control console 3 on the CNC machine 5.

Thus, the digital twin 36 is capable of simulating in real time the operations performed by the real machine 5.

This allows a remote supervisor to oversee operations performed by a trainee on the real machine, or to oversee new methods/procedures tested on the real machine.

The digital twin 36 is also capable of simulating in advance operations that will be performed later by the real machine 5.

This also allows an operator to program and test program changes entered directly on the actual machine tool. If the operator makes a mistake, the virtual machine will be able to anticipate it. The operator will be able to stop the actual machine and adjust the program.

The present disclosure also relates to a method of training operators on a CNC machining device 1 comprising a control console 3 and a CNC machining device 5.

This machine 5 comprises at least one frame 7, at least one manipulator 9 and at least one machining tool 11 which can be handled by the at least one manipulator 9. The CNC machine 5 is controlled by the control console 3.

The method is specifically designed to be implemented with the training assembly described above. Conversely, the training assembly is specially adapted to implement the method to be described here.

The control console 3 is as described above.
The CNC machine 5 is as described above.
The method comprises the following steps:
providing a training control console 35 substantially identical to the control console 3 of the CNC machining device 1;
providing a simulator 37 of the CNC machine 5;
acquiring commands generated by the trainee using the training control console 35;
simulating the effect of the commands transmitted to the CNC machine 5 using the simulator 37;
displaying a current state of the simulator 37 on a display device 39 during the simulation.

The training control console 35 is as described above.
The simulator 37 is as described above.
The display device 39 is as described above.
The commands generated by the trainee on the training control console 35 are as described above.

The commands generated by the trainee and acquired in the acquisition stage comprise at least:
loading a machining program 59 that can be used by the CNC machine 5 to machine a workpiece into the training CNC console 35;
running said machining program by the simulator 37;
The simulator 37 in the simulation step simulating the running of said machining program by the CNC machine 5.

The machining program 59 is as described above.
Advantageously, the method comprises a step of providing a digital model 61 of a workpiece blank 21, the simulator 37 in the simulation step simulating the running of said machining program 59 by the CNC machine 5 using said digital model 61 of the workpiece blank 21.

The blank 21 is as described above.
The digital model 61 of the blank 21 is as described above.

The simulator 37 uses the digital model 61 of the blank 21 to calculate with great accuracy the material removals from the blank 21 resulting from the various movements of the machining tool 11, as well as the shape of the blank 21 after material removal.

Advantageously, the method comprises a step of providing at least one digital model 63 of the at least one machining tool 11, the simulator 37 in the simulation step simulating the running of said machining program 59 by the CNC machine 5 using said digital model 63 of the at least one machining tool 11.

The digital model 63 of the machining tool 11 is as described above.

The simulator 37 uses the digital model 63 to calculate with great accuracy the material removals from the blank 21 resulting from the various movements of the machining tool 11, as well as the shape of the blank 21 after material removal.

Preferably, the method comprises:
a step of providing at least one digital model 65 of a blank 21 clamping tool 25;
a step of generating and transmitting to the digital twin 36 the digital information necessary to place the blank 21 and the tools for clamping the blank 21 onto the frame 7 at a determined position, the simulator 37 in the simulation step simulating the clamping of the blank 21 onto the frame 7 at said determined position using the at least one digital model 61 of the blank 21 and the at least one digital model 65 of the blank clamping tool 25.

The blank clamping tool 25 is as described above.
The digital model 65 of the blank clamping tool 21 is as described above.

The simulator 37 uses the at least one digital model 65 of the blank clamping tool and the at least one digital model 61 of the blank 21 to simulate the clamping of the blank 21 on the frame 7, typically on the moving platen 7″, at said determined position.

This contributes to the accuracy of the simulation of the machining to be performed and the accuracy of the simulation for collision detection.

Advantageously, the method further comprises a step of providing a digital model 67 of the workpiece in the final state, the simulation step comprising a sub-step of determining dimensions of the blank 21 during and/or at the end of machining and a sub-step of comparing said dimensions with corresponding dimensions of said digital model 67 of the workpiece in the final state.

The digital model 67 of the workpiece in the final state is as described above.

The dimensions of the blank 21 during and/or at the end of the machining process are determined by calculation using the data from the simulation. The corresponding dimensions of the workpiece in the final state are determined by calculation using the data from the digital model 67. The comparison is made by calculating the difference between the dimension of the blank 21 during and/or at the end of the machining process and the corresponding dimension of the workpiece. The dimensional differences between the machined blank and the final workpiece are provided to the operator. For example, they are displayed on a screen on the interface module 39.

Preferably, the method comprises the following steps:
detecting interference between parts of the CNC machine 5 or between a part of the CNC machine 5 and the blank 21;
detecting too rapid an arrival of the machining tool 11 in the blank 21.

These detections are carried out as described above.

The step of detecting interference comprises a sub-step of warning the trainee when interference is detected, either by an audible or visual signal.

The step of detecting too rapid an arrival comprises a sub-step of warning the trainee when too rapid an arrival is detected, either by an audible or visual signal.

The errors detected (interference, too rapid arrivals) are saved in a memory 70 of the training assembly 33. The operator can view the detected errors, for example on the display device 39, after the training session has ended.

The commands generated by the trainee and acquired in the acquisition stage preferably comprise one or more of the following commands:
loading an identification of the at least one machining tool 11;
entering data relating to the dimensions of the at least one machining tool 11;
moving at least one axis of the CNC machine 5;
entering corrective data to correct the use of the at least one machining tool 11 in the event of a fault due to an incorrect setting of the machining tool 11 on the CNC machine 5 or due to wear of the at least one machining tool 11;
replacing one machining tool 11 with another.

The effect of said at least one command on the CNC machine is simulated by the simulator in the simulation step.

The commands are as described above.

The commands generated by the trainee and acquired in the acquisition stage preferably comprise one or more of the following commands:
stopping at a point of said machining program, a shape of the blank 21 at said point being saved;
resuming said machining program from said point, using said saved shape;
quitting at a point of said machining program, a shape of the blank 21 at said point being saved.

The effect of said at least one command on the CNC machine is simulated by the simulator in the simulation step.

The commands are as described above.

Preferably, in the simulation step, the simulator 37 simulates:
the noise generated by the CNC machine 5; and/or
the vibrations generated by the CNC machine 5; and/or
the direction of rotation of the machining tool 11; and/or
the lubrication of the machining tool 11.

This simulation is performed as described above.

What is claimed is:
1. A manufacturing assembly comprising:
a CNC machining device comprising a control console and a CNC machine with at least one axis having at least one frame, at least one manipulator and at least one machining tool capable of being manipulated by the at least one manipulator, the CNC machine being controlled by the control console; and
a training assembly for training operators on the CNC machining device, the training assembly comprising:
a training control console substantially identical to the control console of the CNC machining device;
a digital twin of the CNC machining device, comprising a simulator and an interface module connecting the training control console to the simulator, the interface module being configured to transmit to the simulator commands generated by a trainee using the training control console, the simulator being configured to simulate an effect of the transmitted commands on the CNC machine; and
a display device configured for a trainee to view a current status of the simulator;
the digital twin being connected to the control console of the CNC machine, such that the simulator simulates the effect of commands generated by an operator on the control console on the CNC machine.

2. The assembly according to claim 1, wherein the assembly comprises at least one machining program for use by the CNC machine to machine a workpiece, the CNC training console being configured for the trainee to be able to generate the following commands:
loading the at least one machining program into the CNC training console; and
running said machining program by the simulator;
the simulator being configured to simulate the running of said machining program by the CNC machine.

3. The assembly according to claim 2, wherein the assembly comprises at least one digital model of a blank of the workpiece, the simulator being configured to simulate the running of said machining program by the CNC machine on said blank using said digital model of the blank.

4. The assembly according to claim 3, wherein the training control console is configured so that the trainee can generate one or more of the following commands:
stopping at a point of said machining program, a shape of the blank at said point being saved;
resuming said machining program from said point, using said saved shape; and
quitting said machining program at a point, a shape of the blank being saved at said point;
the simulator being configured to simulate the running of said command by the CNC machine.

5. The assembly according to claim 4, wherein the assembly comprises at least one digital model of a blank clamping tool, the training control console being configured so that the trainee can generate and transmit to the interface module digital information necessary for placing the blank and the blank clamping tools on the frame at a determined position, the simulator being configured to simulate the clamping of the blank on the frame at said determined position using the at least one digital model of the blank and the at least one digital model of the blank clamping tool.

6. The assembly according to claim 3, wherein the assembly comprises at least one digital model of the workpiece in a final state, and a module configured to determine dimensions of the blank during and/or at an end of machining and to compare said dimensions with corresponding dimensions of the digital model of the workpiece in the final state.

7. The assembly according to claim 3, wherein the assembly comprises a module configured to detect:
interference between parts of the CNC machine or between a part of the CNC machine and the blank; and
too rapid an arrival of the machining tool in the blank.

8. The assembly according to claim 2, wherein the assembly comprises at least one digital model of the at least one machining tool, the simulator being configured to simulate an execution of said machining program by the CNC machine using said digital model of the at least one machining tool.

9. The assembly according to claim 1, wherein the training control console is configured so that the trainee can generate one or more of the following commands:
   loading an identification of the at least one machining tool;
   entering data relating to dimensions of the at least one machining tool;
   moving the at least one axis of the CNC machine;
   entering correction data for correcting the use of the at least one machining tooling in the event of a fault due to an incorrect setting of the machining tool on the CNC machine or due to wear of the at least one machining tool;
   replacement of a machining tool by another one;
   the simulator being configured to simulate the effect of the at least one command on the CNC machine.

10. The assembly according to claim 1, wherein the simulator is configured to simulate:
   noise generated by the CNC machine; and/or
   vibrations generated by the CNC machine; and/or
   a direction of rotation of the machining tool; and/or
   lubrication of the machining tool.

11. A method for training operators on the manufacturing assembly according to claim 1, the method comprising the following steps:
   acquiring commands generated by a trainee using the training control console;
   simulating an effect of the generated commands on the CNC machine using the simulator; and
   displaying a current status of the simulator on a display device during the simulation.

12. The method according to claim 11, wherein the commands generated by the trainee and acquired in the acquiring step comprise at least:
   loading a machining program into the CNC training console for use by the CNC machine to machine a workpiece; and
   running said machining program by the simulator;
   the simulator in the simulation step simulating the running of said machining program by the CNC machine.

13. The method according to claim 12, wherein the method comprises a step of providing a digital model of a workpiece blank, the simulator in the simulation step simulating the running of said machining program by the CNC machine using said digital model of the workpiece blank.

14. The method according to claim 13, wherein the commands generated by the trainee and acquired in the acquisition step comprise at least one of the following commands:
   stopping at a point of said machining program, a shape of the blank at said point being saved;
   resuming said machining program from said point, using said saved shape; and
   quitting said machining program at a point, a shape of the blank being saved at said point;
   the effect of said at least one command on the CNC machine is simulated by the simulator in the simulation step.

15. The method according to claim 13, wherein the method comprises:
   providing at least one digital model of a blank clamping tool; and
   generating and transmitting to the digital twin digital information necessary to place the blank and the tools for clamping the blank onto the frame at a determined position;
   the simulator in the simulation step simulating the clamping of the blank onto the frame at said determined position using the at least one digital model of the blank and the at least one digital model of the blank clamping tool.

16. The method according to claim 13, wherein the method comprises a step of providing a digital model of the workpiece in a final state, the simulation step comprising a sub-step of determining dimensions of the blank during and/or at an end of machining and a sub-step of comparing said dimensions with corresponding dimensions of said digital model of the workpiece in the final state.

17. The method according to claim 13, wherein the method comprises the following steps:
   detecting interference between parts of the CNC machine or between a part of the CNC machine and the blank; and
   detecting too rapid an arrival of the machining tool in the blank.

18. The method according to claim 12, wherein the method comprises a step of providing at least one digital model of the at least one machining tool, the simulator in the simulation step simulating the running of said machining program by the CNC machine using said digital model of the at least one machining tool.

19. The method according to claim 11, wherein the commands generated by the trainee and acquired in the acquiring step comprise at least one of the following commands:
   loading an identification of the at least one machining tool;
   entering data relating to dimensions of the machining tool;
   moving the at least one axis of the CNC machine;
   entering corrective data relating to the dimensions of the machining tool; and
   replacing a machining tool with another one;
   the effect of the at least one command on the CNC machine being simulated by the simulator in the simulation step.

20. The method according to claim 11, wherein the simulation step comprises one or more of the following operations:
   simulating noise generated by the CNC machine; and/or
   simulating vibrations generated by the CNC machine; and/or
   simulating a direction of rotation of the machining tool; and/or
   simulating lubrication of the machining tool.

21. A method for training operators on the manufacturing assembly according to claim 1, the method comprising the following steps:
   acquiring commands generated by the trainee using the control console of the CNC machining device;
   simulating the effect of the commands generated by the trainee on the CNC machine using the simulator; and
   displaying a current status of the simulator on a display device during the simulating step.

22. A method for training operators on the manufacturing assembly according to the claim 21, wherein the simulator simulates in real time operations performed by the CNC machine according to the commands generated by the trainee.

\* \* \* \* \*